(12) United States Patent
Yamamoto et al.

(10) Patent No.: US 7,225,525 B2
(45) Date of Patent: Jun. 5, 2007

(54) METHOD FOR MANUFACTURING ELECTRIC MOTOR

(75) Inventors: Tetsuji Yamamoto, Okazaki (JP); Yoshihiro Matsuya, Okazaki (JP); Akira Hiramitsu, Okazaki (JP); Katsuhiko Tatebe, Seto (JP); Yoshihiro Tanaka, Aichi-ken (JP); Tsuyoshi Yamasaki, Toyota (JP)

(73) Assignee: Jtekt Corporation, Osaka (JP)

( * ) Notice: Subject to any disclaimer, the term of this patent is extended or adjusted under 35 U.S.C. 154(b) by 222 days.

(21) Appl. No.: 10/443,749

(22) Filed: May 23, 2003

(65) Prior Publication Data

US 2005/0125987 A1 Jun. 16, 2005

(30) Foreign Application Priority Data

May 24, 2002 (JP) .............................. 2002-150162

(51) Int. Cl.
*H02K 15/00* (2006.01)
(52) U.S. Cl. .............................. 29/596; 29/548; 29/598; 29/732; 264/272.2; 310/43; 310/71; 310/89
(58) Field of Classification Search .................. 29/596, 29/548, 598, 732; 264/272.2; 310/43, 71, 310/89
See application file for complete search history.

(56) References Cited

U.S. PATENT DOCUMENTS

| | | | | |
|---|---|---|---|---|
| 5,313,698 | A | * | 5/1994 | Schaeftlmeier et al. ........ 29/596 |
| 6,359,355 | B1 | * | 3/2002 | Hartsfield et al. ............. 310/89 |
| 6,806,615 | B2 | * | 10/2004 | Enomoto et al. ............ 310/218 |

FOREIGN PATENT DOCUMENTS

| | | |
|---|---|---|
| DE | 930 765 | 7/1955 |
| JP | 6-245444 | 9/1994 |
| JP | 07-163070 | * 6/1995 |
| JP | 09-308141 | * 11/1997 |
| JP | 11-308820 | 11/1999 |

OTHER PUBLICATIONS

Patent Abstracts of Japan, JP 07-163070, Jun. 23, 1995.
Patent Abstracts of Japan, JP 09-308141, Nov. 28, 1997.
Patent Abstracts of Japan, JP 2001-218429, Aug. 10, 2001.

* cited by examiner

*Primary Examiner*—A. Dexter Tugbang
*Assistant Examiner*—Tim Phan
(74) *Attorney, Agent, or Firm*—Oblon, Spivak, McClelland, Maier & Neustadt, P.C.

(57) ABSTRACT

In a method for manufacturing an electric motor, a cylindrical stator core circumferentially dividable into a plurality of core components is inserted into a circular internal surface of a motor housing. In this case, the motor housing is heated to be expanded thermally thereby enlarge circular internal surface thereof. Then, the stator core is fit over the external surface of an, insertion guide head of a generally cylindrical shape, and the insertion guide head is moved ward toward the thermally expanded motor housing secured on a fixed table to insert the stator re inside the motor housing. When the insertion guide head reaches a predetermined axial position inside the motor housing, a pressing mechanism incorporated in the insertion guide head is operated to press the core components on the circular internal surface of the motor using. Then, the motor housing is contracted as the temperature thereof goes down, whereby the core components are secured such that each of core components is pressed at lateral surfaces thereof against the next core components in the circumferential direction as a result of being pressed by the circular internal surface of the motor housing.

7 Claims, 6 Drawing Sheets

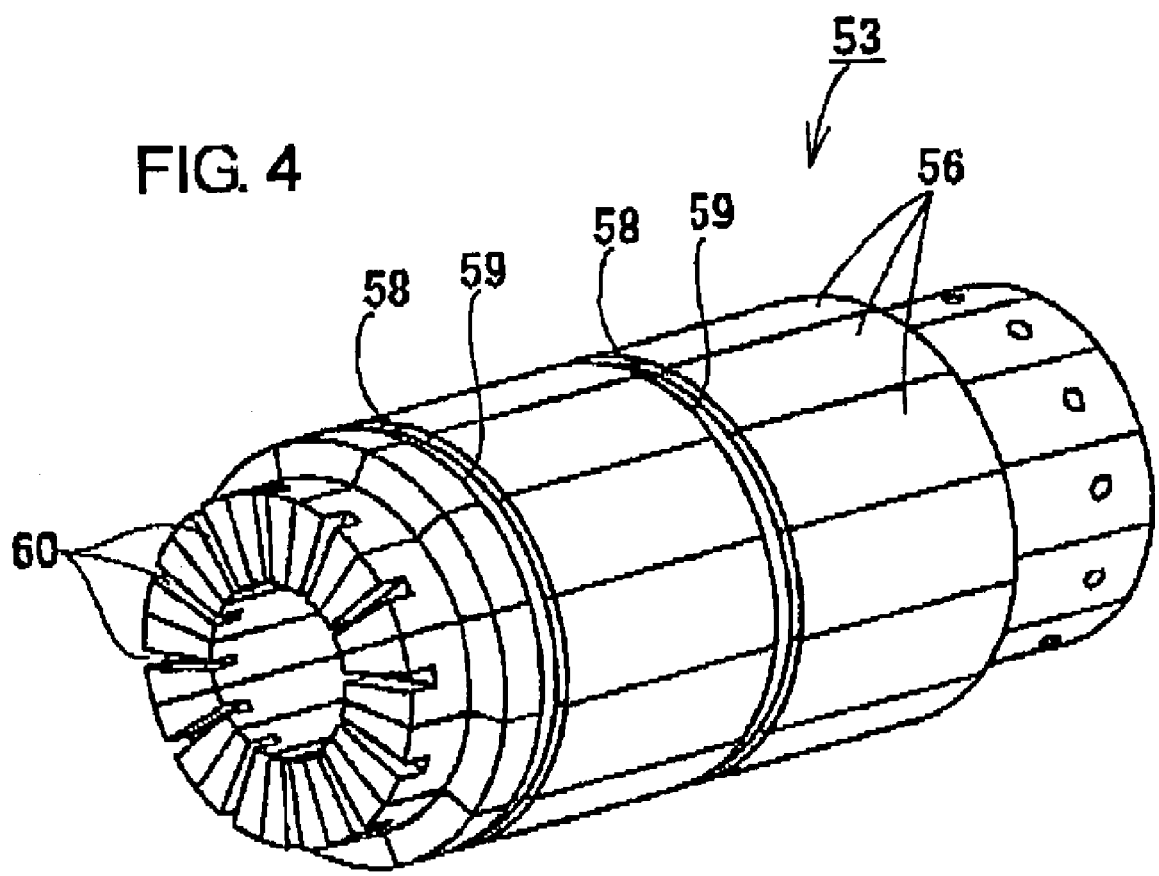

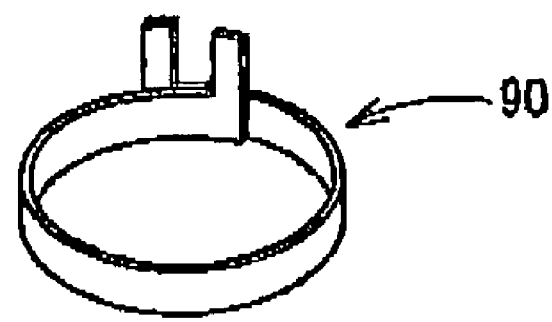
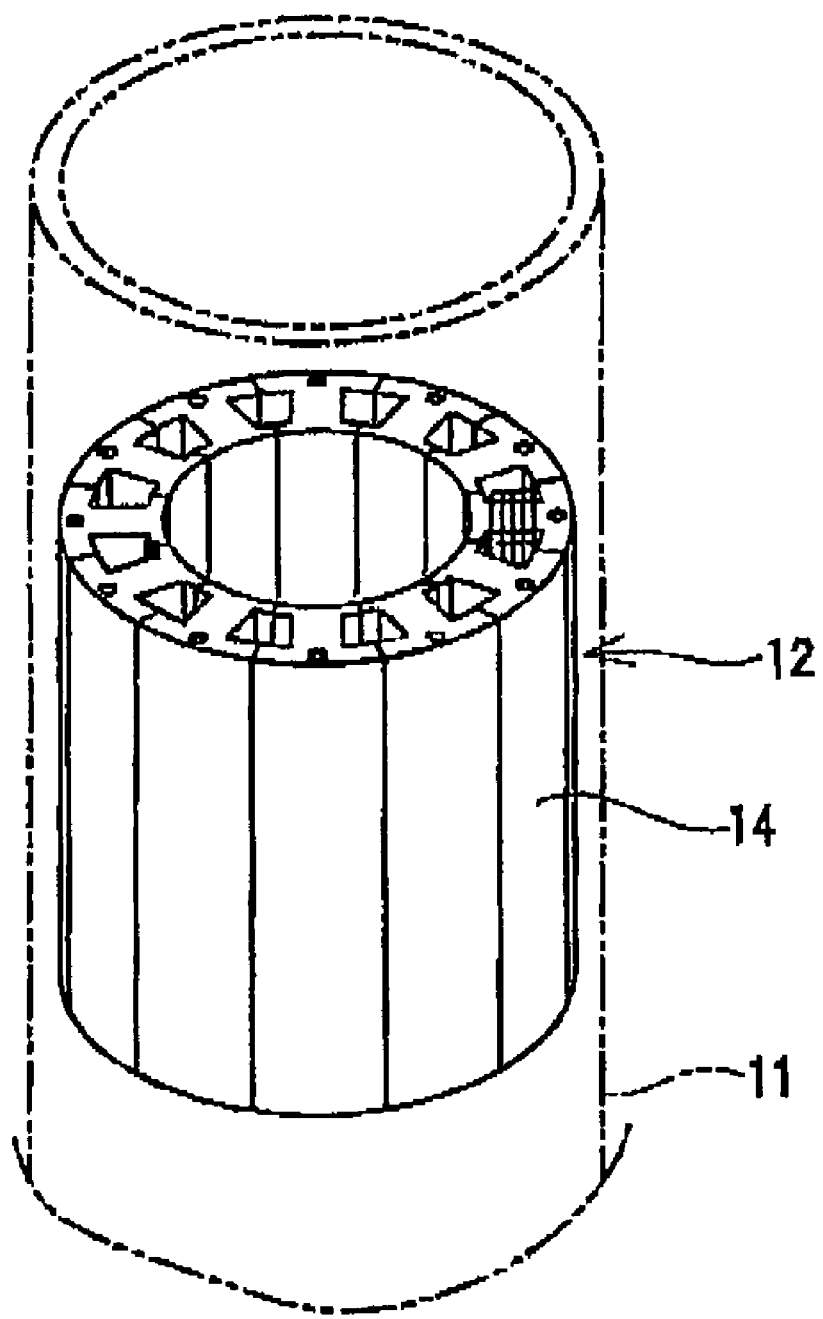
FIG. 6

METHOD FOR MANUFACTURING ELECTRIC MOTOR

INCORPORATION BY REFERENCE

This application is based on and claims priority under 35 U.S.C. § 119 with respect to Japanese Application No. 2002-150162 filed on May 24, 2002, the entire contents of which are incorporated herein by reference.

BACKGROUND OF THE INVENTION

1. Field of the Invention

The present invention relates to a method and apparatus for manufacturing an electric motor of the type wherein a cylindrical stator core circumferentially dividable to plural core components is shrinkage-fit in a circular internal surface of a motor housing.

2. Discussion of the Related Art

In electric motors of the type that a stator core is dividable into a plurality of core components, a stator core is constituted, taking the work-to-easy capability in winding process into consideration, by effecting a winding process on each of the core components and then by integrating the core components. Then, a shrinkage fitting process is carried out. Specifically, the stator core is inserted into a thermally expanded cylindrical housing, whereby the stator core is securely tightened circumferentially within the cylindrical housing which then shrinks thermally to a smaller diameter.

However, in the prior art motor manufacturing method, the respective core components are displaced with respect to each another in the course of the cylindrical housing shrinking thermally. This causes air gaps between the stator core and a rotor around the same to be uneven, so that an unfavorable influence is exerted on the torque performance or the like of the electric motor so manufactured.

SUMMARY OF THE INVENTION

Accordingly, it is a primary object of the present invention to provide an improved motor manufacturing method and apparatus capable of heightening the accuracy in assembling plural core components constituting a stator core.

Briefly, according to the present invention, there is provided a method of manufacturing an electric motor by fitting a cylindrical stator core circumferentially dividable into a plurality of core components, into a circular internal surface of a motor housing. The method comprises the steps of thermally expanding the motor housing; inserting the stator core inside the thermally expanded motor housing; and thermally contracting the housing with the core components being kept pressed on the circular internal surface of the motor housing.

With this construction, the stator core can be secured within the motor housing without using any positive clamping means, and the plurality of core components can be secured bodily as a whole without providing any clearance between the external surface of the stator core and the circular internal surface of the motor housing. Therefore, the motor manufactured by the method of the present invention can be simple in construction, inexpensive in cost and reliable in operation.

Preferably, the method of exemplary embodiments of the invention includes the step of expanding the core components radially outward within the thermally expanded motor housing thereby to press the core components on the circular internal surface of the motor housing prior to the step of thermally contracting the motor housing. With this configuration, the plural core components constituting the stator core are radially inwardly displaced bodily with the motor housing while the same is contracted as time goes. This advantageously provides an electric motor of the character that the stator core can be bodily with and precisely coaxial with the motor housing.

In another aspects of exemplary embodiments of the invention, there is provide an apparatus for manufacturing an electric motor, wherein a cylindrical stator core circumferentially dividable to plural core components are inserted into a circular internal surface of a motor housing. In the apparatus, a pressing device is provided for pressing the core components from the inside of the stator core onto the circular internal surface of the motor housing having been thermally expanded.

With this configuration, the core components are pressed radially outward to closely fit in the circular internal surface of the motor housing. As the motor housing is then contracted into a smaller diameter, the core components are displaced radially inwardly and finally secured with each component being pressed by the circular internal surface and thereby being brought into abutting engagement with two components next thereto. This provides a rigid assembling of the motor housing and the stator core.

BRIEF DESCRIPTION OF THE ACCOMPANYING DRAWINGS

The foregoing and other objects and many of the attendant advantages of the present invention may readily be appreciated as the same becomes better understood by reference to the preferred embodiments of the present invention when considered in connection with the accompanying drawings, wherein like reference numerals designate the same or corresponding parts throughout several views, and in which:

FIG. 4 is a perspective view of an axial split cylindrical body incorporated in the insertion guide head;

Figure 5A:
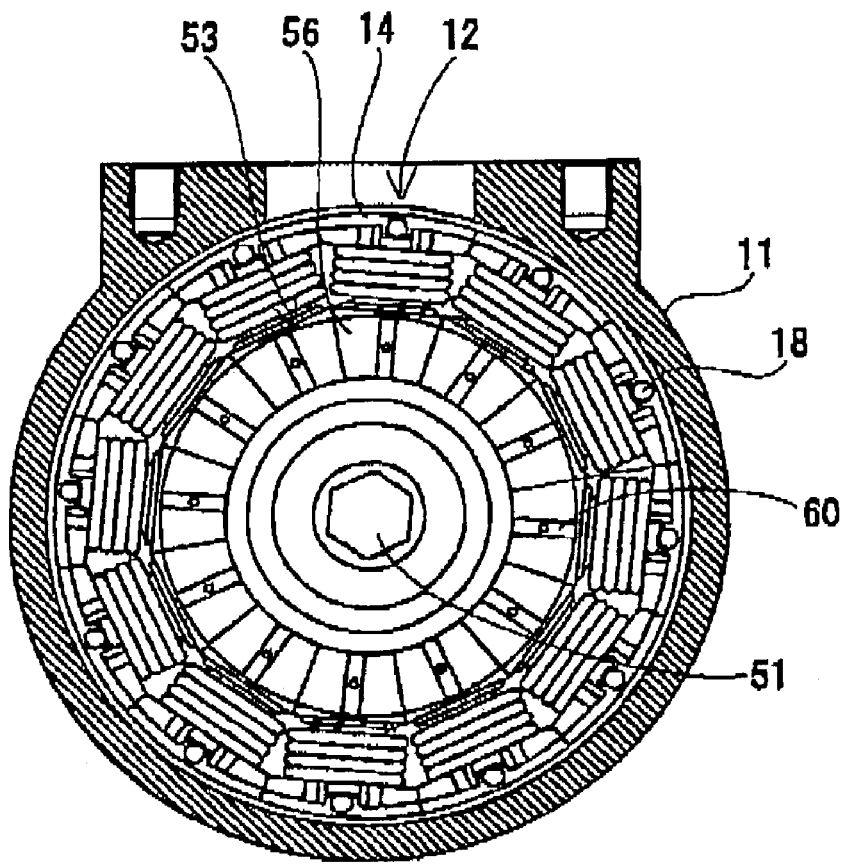
Figure 5B:
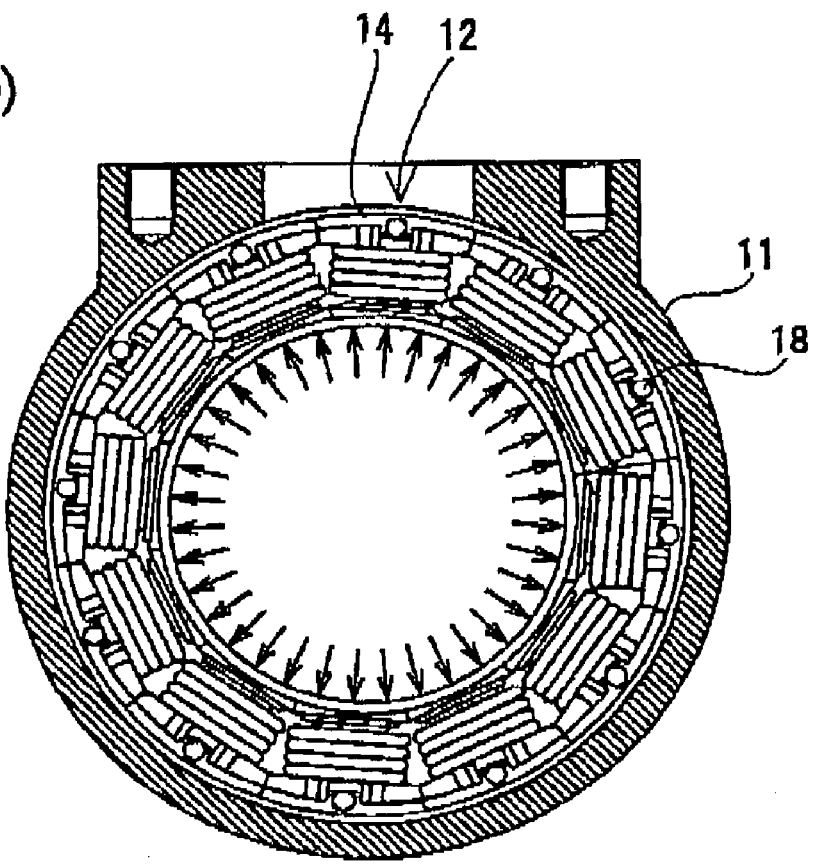

FIGS. 5(A) and 5(B) are respectively a cross-section of the assembly of a motor housing, a stator core and the insertion guide head and another cross-section of the assembly of a motor housing and a stator core; and FIG. 6 is a perspective view showing a modification of the embodiment.

DETAILED DESCRIPTION OF THE PREFERRED EMBODIMENT

Figure 1:
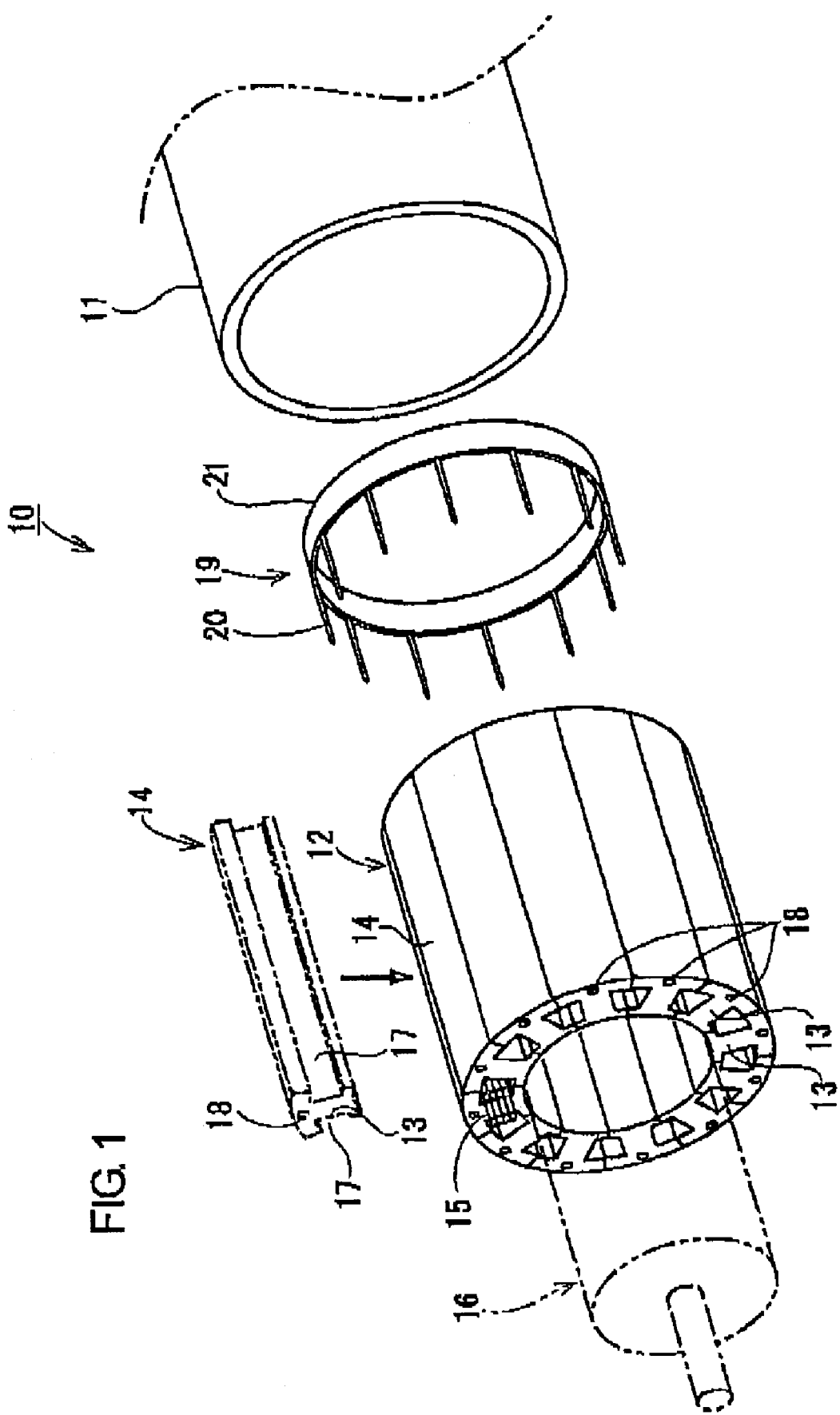
FIG. 1 is a perspective view of an electric motor in a disassembled state according to the first embodiment of the present invention.

Hereafter, the first embodiment of the present invention will be described with reference to FIGS. 1 to 5. An electric motor 10 shown in FIG. 1 is a brushless motor incorporating a stator core 12 within a motor housing 11. The motor housing 11 is made F, for example, aluminum casting, takes a cylindrical form opening at both ends thereof and is machined to be round at the internal surface thereof. The stator core 12 also ekes a cylindrical form with both ends opening as a whole and is of the configuration that it is circumferentially dividable into a plurality of core components 14. More specifically, the stator core 12 has twelve (12) teeth 13 for example and is dividable into twelve core components 14 on a tooth-by-tooth basis. After winding process is performed on each core component 14 as described later in detail, the group of the core components 14 reunited bodily to constitute a cylindrical stator core 12, which is then secured by shrinkage fit onto the circular internal surface of the motor housing 11. A motor manufacturing apparatus 30 which the present invention is applied to is used for implementing the shrinkage fit.

Figure 2:
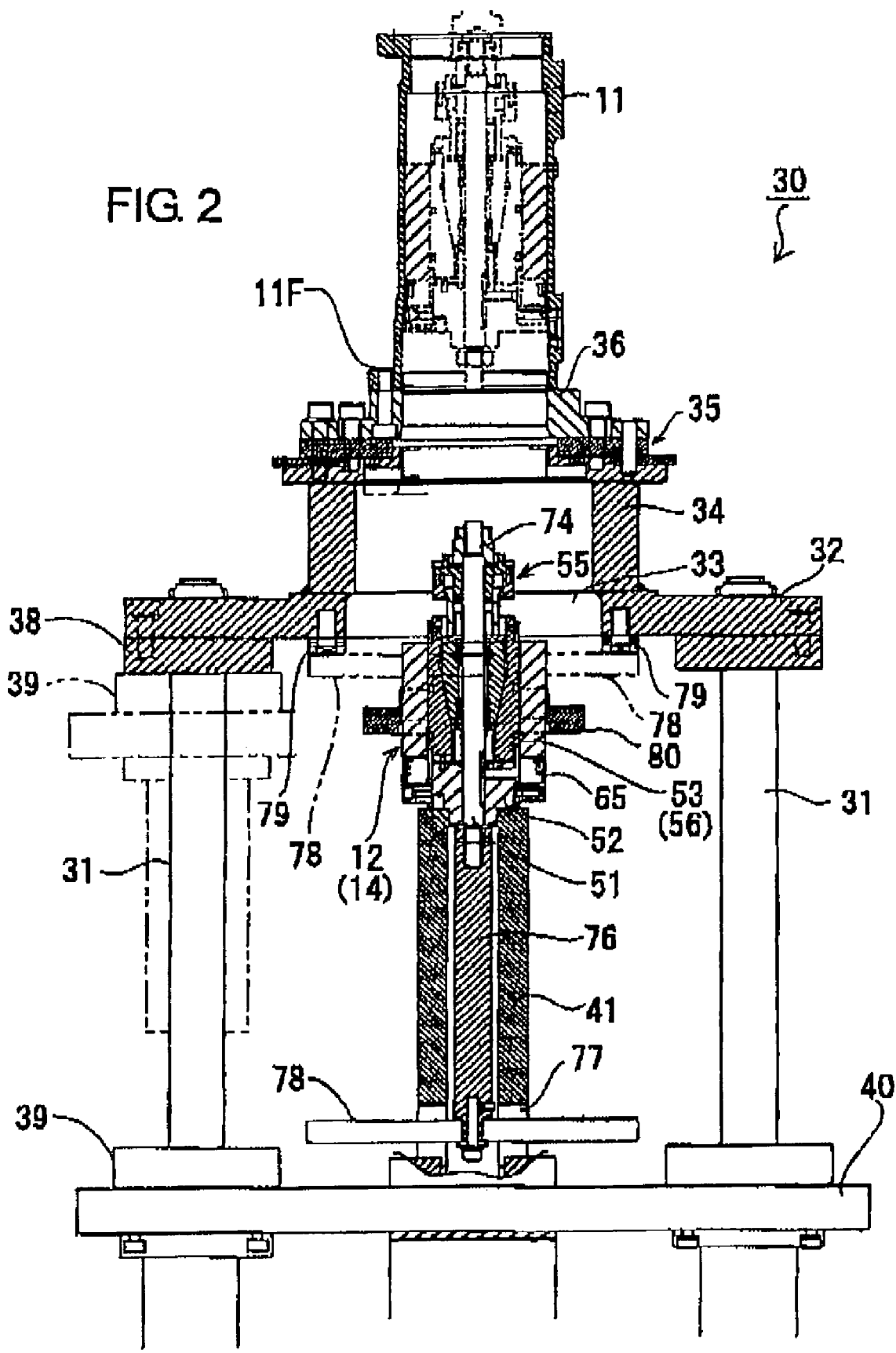
FIG. 2 is a longitudinal sectional view of a motor manufacturing apparatus according to the first embodiment of the present invention.

Referring then to FIG. 2, the motor manufacturing apparatus 30 is shown having a fixed table 32 on the top portions of a plurality of guide posts 31. The fixed table 32 has formed a through bore 33 extending therethrough, and a housing fixing portion 35 is provided on the top surface of a surrounding wall 34 which is upstanding from the edge portion around the through bore 33. The housing fixing portion 35 is formed with a fixing base 36 whose ends open upward and downward respectively, and the motor housing 11 is fit at its one end in the upper end portion of the fixing base 36 with a flange 11F provided on the motor housing 11 being screwed into the housing fixing portion 35.

A movable table 40 is provided under the fixed table 32 in face-to-face relation. The movable table 40 has cylinder devices (or hydraulic jacks) as a drive source provided at the lower surface thereof and is moved thereby up and down along the guide posts 31. The movable table 40 is displaceable to an end position where stops 39 protruding from the upper surface of the movable table 40 are brought into abutting engagement with stop rests 38 provided at the lower surface of the fixed table 32.

Figure 3:
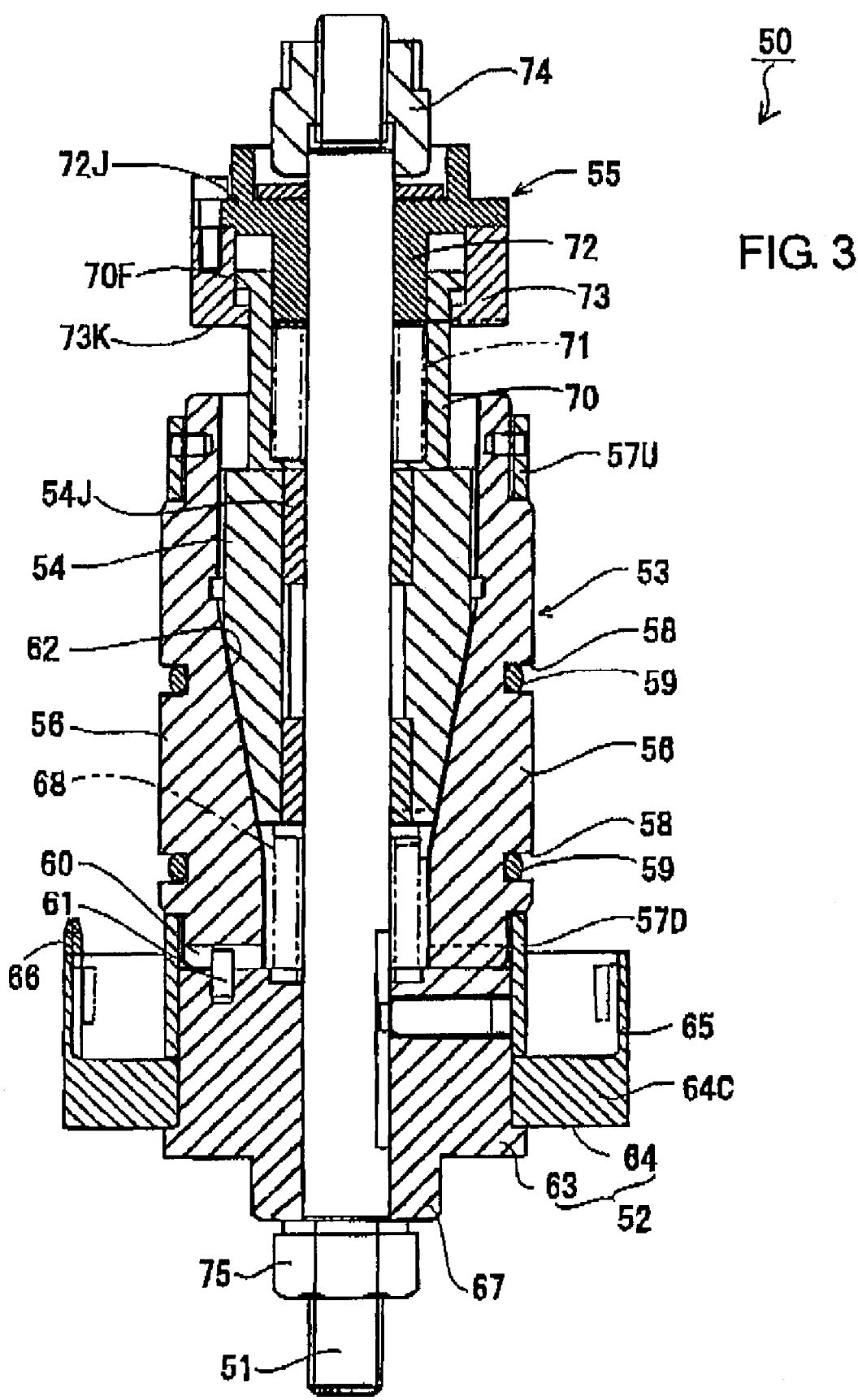
FIG. 3 is a longitudinal sectional view of an insertion guide head incorporated in the motor manufacturing apparatus.

A cylindrical support sleeve 41 is upright from the movable table 40 in axial alignment with the aforementioned housing fixing portion 35 and mounts an insertion guide head 50 on the top thereof. As shown in FIG. 3 on an enlarged scale, the insertion guide head 50 is assembled by fitting a base portion 52, a verticals split cylindrical body 53, a tapered shaft or sleeve 54 and a pressing assembly 55 in such order over a straight-motion shaft 51 extending vertically. The base portion 52, the vertical slit cylindrical body 53, the tapered sleeve 54 and the pressing assembly 55 constitute pressing mechanism which presses the core components 14 from the inside of the stator core 12 on the circular internal surface of the motor housing 11 while the same is thermally expanded, as described later in detail. Thus, the insertion guide head 50 incorporates the pressing mechanism therein. An upper end nut 74 is screwed at the upper end of the straight-motion shaft 51 to prevent the pressing assembly 55 from coming off the straight-motion shaft 51. On the other hand, a lower end nut 75 is screwed at the lower end portion of the straight-motion shaft 51 to prevent the base portion 52 from coming off the straight-motion shaft 51.

The base portion 52 includes a hood member 64 which is fit over the external surface of a cylindrical base body 63. The hood member 64 is formed with a cylindrical wall 65 which is upstanding form the circumferential edge portion of a disc 64C which is fixedly fit over the cylindrical base body 63. As shown in FIG. 2, the stator core 12 is placed on an annular top surface of the cylindrical wall 65. The external diameter of the cylindrical wall 65 is made slightly smaller than that of the stator core 12, so that cylindrical wall 65 is able to pass through the bore of a temporarily holding ring 80. During a step of inserting the stator core 12, the ring 80 is fit over the external surface of the stator core 12 in the axial mid position thereof for temporarily holding the stator core 12. The cylindrical wall 65 upwardly protrudes a positioning pin 66 from a portion on the upper edge of the cylindrical wall 65. The positioning pin 66 is inserted with a play into one of axial through holes 18 which are formed in the core components 14 constituting the stator core 12.

The vertical split cylindrical body 53 takes a cylindrical shape as a whole as shown in FIG. 2 which is able to be inserted within the stator core 12 with a play, and is of the configuration that it is circumferentially dividable into a plurality of sector members 56 as shown in FIG. 4. More specifically, the vertical split cylindrical body 53 is constituted by twelve pieces of the sector members 56 which are the same in number as the twelve pieces of the core components 14 constituting the stator core 12. The axial opposite end portions of the vertical split cylindrical body 53 are made slightly smaller in diameter than the middle portion thereof, and arresting rings 57U, 57D are fit respectively over the small diameter end portions, as shown in FIG. 3. These arresting rings 57U, 57D hold the sector members 56 in a cylindrical shape and allow the sector members 56 to slightly displace in radial directions thereof.

A plurality of pins are inserted through the upper arresting ring 57U at equiangular distances in the circumferential direction and enter some of the sector members 56 thereby to make the upper arresting ring 57U unable to move up and down. The lower arresting ring 57D is partly fit over the base portion 52 (i.e., the cylindrical base body 3) and is vertically sandwiched between the base portion 52 and a stepped portion of the vertical split cylindrical body 53, so that the lower arresting ring 57D is fixed not to movable vertically.

As shown in FIG. 4, two annular grooves 58, 58 are circumferentially extended at two parts spaced in the axis direction of the vertical split cylindrical body 53 to encircle the sector members 56. An O-ring 59 constituting an annular elastic member is fit in each of the annular grooves 58 with itself being deformed to be stretched. Thus, with the elastic forces of the O-rings 59, the vertical split cylindrical body 53 is normally held in the state of a minimum diameter thereof with every adjoining sector members 56 being brought to fit closely with each other.

Each of the sector members 56 is formed with a guide groove 60 which extends radially from the center or axis of the vertical split cylindrical body 53. Twelve guide pins 61 (only one shown in FIG. 3) which are upstanding from the upper surface of the cylindrical base body 63 are fit respectively in the guide grooves 60 to, serve as cam followers.

As shown in FIG. 3, at the interior of the vertical split cylindrical body 53, the diameter of the upper portion is made larger than that of the lower portion, and a taper surface 62 is formed at the middle portion to be enlarged gradually as it goes up. A return coil spring 68 is retained inside the lower part of the vertical split cylindrical body 3. The coil spring 68 is resiliently deformed when sandwiched between the tapered sleeve 54 and the base portion 52.

The tapered sleeve 54 is formed with an external taper surface which is made smaller as it goes down, and is fit at its the external taper surface in an inner taper surface 62 of the vertical split cylindrical body 53. Slide bearings 54J are press-fit inside the tapered sleeve 54 thereby to reduce the sliding resistance against the straight-motion shaft 51.

The construction of the pressing assembly 55 is such that a thrusting coil spring 1 as a pressing resilient member is retained inside a spring retainer cylinder 70 having bottom at the lower end and that a pressing sleeve 72 is inserted into the spring retainer cylinder 70 from the upper opening thereof. Thus, the thrusting coil spring 71 is deformable to be compressed between the pressing sleeve 72 and the bottom of the spring retainer cylinder 70. A removal resistant sleeve 73 is secured by means of bolts to n outer flange 72J which extend laterally from the upper end of the pressing sleeve 72, and an inner flange 73K is radially inwardly extended from the lower end of the anti-coming-off sleeve 73. An outer flange 70F extending outwardly from the upper end f the spring retainer cylinder 70 is placed between the inner flange 73K and the outer flange 72J in a vertical direction to limit the relative motion distance between the spring retainer cylinder 70 and the pressing sleeve 72 to a predetermined distance.

Referring back to FIG. 2, the aforementioned insertion guide head 50 downwardly protrudes a centering boss 67 from the center of the lower surface of the base portion 52 and is mounted on the cylindrical support sleeve 41 with the centering boss 67 being fit in the cylindrical support sleeve 41. Further, the straight-motion shaft 51 of the insertion guide head 50 is formed with a screw portion at the lower end thereof and the screw portion is joined with a relay shaft 76 which is vertically movable within the cylindrical support sleeve 41.

A cross hole 77 is formed to extend across the lower end portion of the cylindrical support sleeve 41. The cross hole 77 is an elongated hole which is elongated vertically. A cross bar 78 passes through the cross hole 77 and is secured at the center thereof to the lower end portion of the relay shaft 76 with opposite ends thereof projecting from the cross hole 77. Right before the movable table 40 is moved upward to reach the end position, the opposite end portions of the cross bar 78 are brought into abutting engagement with bar stops 79, 79 provided at the lower surface of the fixed table 32. When the movable table 40 is moved up to the end position, the relay shaft 76 is drawn downwardly relative to the cylindrical support sleeve 41. The position that the upper end nut 74 takes when the relay shaft 76 is drawn to the lowermost end position is defined as first position. On the other hand, the position that the upper end nut 74 takes before the cross bar 78 is brought into abutting engagement with the bar stops 79, that is, before the relay shaft 76 is drawn downwardly is defined as second position.

As shown in FIG. 2, before the stator core 12 is inserted into the motor housing 11, a temporarily holding ring 80 is fit over the external surface of the stator core 12. The temporarily holding ring 80 is made by forming a round through hole in a flat plate and providing a cylindrical wall upstanding from the opening edge portion of the flat plate.

Description will then be made with respect to the method of manufacturing the electric motor 10 by the motor manufacturing apparatus 30 of the construction as described above. First of all, the stator core 12 is disassembled with respective to the core components 14, and an electric wire is wound around each core component 14 along coil retaining slots 17, 17 opening at both lateral sides thereof. Thus, a coil 15 is constituted on each core component 14. Tn this case, both terminals (not shown) of each coil 15 are left drawn to one end in axial direction of the core component 14.

Then, as depicted in FIG. 1, the core components 14 are assembled to constitute a cylindrical stator core 12 with a temporarily holding ring 80 being fit over the external surface thereof. In this case, the core components 14 are oriented to gather the both terminals of the coil 15 on each core component 14 at the same side in axial direction of the stator core 12. Then, a wire connection ring 19 is coupled to one axial end of the stator core 12 to which end the terminals of the coils 15 have been gathered.

More specifically, the wire connection ring 19 is provided with twelve pins 20 protruding from an axial one end of an annular body 21, as shown in FIG. 1. The wire connection ring 19 is connected to the stator core 12 with the pins 20 being inserted respectively into the axial through holes 18 which are formed in the core components 14 therethrough. The terminals of each coil 15 are secured to those suitable of three conductive rings (not shown) which are provided on the wire connection ring 19, so that the coils 15 are connected to one after another thereby to constitute a three-phase coil assembly as a whole.

Thereafter, with the wire connection ring 19 being held upside, the stator core 12 is fit over the external surface of the insertion guide head 50 of the motor manufacturing apparatus 30. At this time, a positioning pin 66 protruding from the food portion 64 is inserted into one of the axial through holes 18 of the core components 14 and the stator core 12 is mounted at the lower surface thereof on the annular upper surface of the food portion 64 provided on the base portion 52 of the insertion guide head 50. As a consequence, as shown in FIG. 5(A), the stator core 12 is held with the core components 14 thereof respectively facing the sector members 56 of the vertical split cylindrical body 53 in a one-to-one relation.

Upon completion of fitting the stator core 12 in the insertion guide head 50, the motor housing 11 heated in advance is secured to a housing fixing portion 35, after which the motor manufacturing apparatus 30 is put into operation. Thus, the insertion guide head 50 and the stator core 12 together with the movable table 40 are moved up, and the stator core 12 enters the motor housing 11. Since the motor housing 11 has been expanded thermally, the stator core 12 is smoothly inserted into the motor housing 11 with a certain clearance being secured therebetween.

When the stator core 12 is inserted into the motor housing 11 to an intermediate position thereof, the temporarily holding ring 80 is brought into abutting engagement with the lower surface of the housing fixing portion 35 thereby to come off from the stator core 12, and the base portion 52 of the insertion guide head 50 passes through the temporarily holding ring 80, whereby the entirety of the stator core 12 is inserted into the motor housing 11 to the axial center position of the same. Then, immediately before the movable table 40 reaches the upper terminal position of movement, the cross bar 78 is brought into abutting engagement at its opposite ends with the bar stops 79, 79 secured to the lower surface of the fixed table 32, nevertheless the movable table 40 continues to move up to the upper terminal position. Consequently, the relay shaft 76 is drawn downward within the cylindrical support sleeve 41 relative thereto.

This causes the straight-motion shaft 51 coupled to the relay shaft 76 to be drawn relative to the base portion 52 secured to the top surface of the cylindrical support sleeve 41 with the result that the upper end nut 74 secured to the upper end of the straight-motion shaft 51 pushes the pressing assembly 55 downward. At this time, the thrusting coil spring 71 is compressed slightly, whereas the return coil spring 68 is compressed some more. As a result, the tapered sleeve 54 is thrusted into the vertical split cylindrical body 53 to expand the same while stretching the O-rings 59. Namely, the sector members 56 constituting the vertical split cylindrical body 53 are split out in the radial outward directions. Accordingly, the sector members 56 push out the core components 14 of the stator core 12, and the core components 14 are pressed on the circular internal surface of the motor housing 11, as illustrated in FIG. 5(B).

Here, since the sector members 56 and the core components 14 correspond to each other in a one-to-one relation, each on the sector members 56 presses out a corresponding one of the core components 14. Thus, each of the sector members 56 is pressed at the center thereof in the circumferential direction, so that it is pressed on the circular internal surface of the motor housing 11 without being inclined. Moreover, the sector members 56 are guided in the radial directions through the sliding engagement of the guide groove 60 with the guide pins 61 and can press the corresponding core components stably. In this way, the core components 14 are closely fit in the circular internal surface of the motor housing 11 to be positioned thereat. It is to be noted that the positioning pin 66 is in engagement with the core component 14 with a certain play and hence, does not impede the radial outward displacement of that core component 14.

Passing through a predetermined time period is awaited in this state to allow the motor housing 11 to contract thermally by natural radiation of heat and/or compulsory radiation of heat. As the motor housing 11 is deformed to make the diameter thereof contract, the vertical split cylindrical body 53 together with the stator core 12 is tighten to be squeezed, which causes the tapered sleeve 54 is retracted upward against the thrusting coil spring 71. In the course of being retracted, the tapered sleeve 54 is still kept thrusted by the resilient force of the thrusting coil spring 71, so that each of the sector members 56 goes on to press the corresponding core component 14 on the circular internal surface of the motor housing 11.

When the predetermined time period expires to go down the heat of the motor housing 11 to a predetermined temperature, the core components 14 come to join each another to make the stator core 12 like one body. Then, the movable table 40 is allowed to begin downward movement. With this downward movement, the amount through which the straight-motion shaft 51 has been withdrawn relative to the vertical split cylindrical body 53 is gradually reduced. This enables the tapered sleeve 54 to retract upward thanks to the resilient forces of the return spring 68 and the O-rings 59. Further, as the movable table 40 is moved down further, the cross bar 78 departs from the bar stops 79. This enables the vertical split cylindrical body 53 to be squeezed up to the state of a minimum diameter thereof. As a consequence, the vertical split cylindrical body 53 is turned to the state that it has a sufficient play of clearance with respect to the internal surface of the stator core 12 and therefore, is smoothly drawn out therefrom downward thereby to return the movable table 40 to the initial position.

Subsequently, the motor housing 11 is removed from the housing fixing portion 35. After the temperature of the motor housing 11 goes down to the ambient temperature, a rotor 16 shown in FIG. 1, bearings not show and the like are assembled to the motor housing 11, and the opposite ends of the same are closed by end cap members or the like, whereby the motor 10 is completed.

As described hereinabove, in the motor manufacturing apparatus 30 and the motor manufacturing method according to the present invention, the core components 14 are pressed on and positioned at the circular internal surface of the motor housing 11 in the course that the motor housing 11 contracts thermally, so that it does not occur that the core components 14 would be displaced when assembled, as is true in the case of the prior art. Therefore, the internal surface of the core components 14 so assembled becomes a circular shape which precisely coincide with that of the motor housing 11 in a complete coaxial alignment therewith, so that the accuracy in assembling of the core components 14 can be heightened in comparison with that in the prior art.

OTHER EMBODIMENTS OR MODIFICATIONS

The present invention is not limited to the foregoing embodiment, and other embodiments or modifications described below for example are encompassed in the technical scope of the present invention. Further, without departing from the gist or spirit thereof, the present invention may otherwise be practiced in the form of being varied or modified in various respects as follows:

(1) In place of the vertical split cylindrical body 53 in the foregoing embodiment, a pressing ring 90 is constituted in advance by forming a spring leaf to a ring shape as shown in FIG. 6 for instance. And, after inserting the stator core 12 into the thermally expanded motor housing 11, the pressing ring 90 which has been resiliently deformed to a smaller diameter is placed inside the stator core 12, whereby the core components 14 of the stator core 12 can be pressed on the circular internal surface of the motor housing 11.

(2) Although the thermal contract of the motor housing 11 is judged by the expiration of time period for heat radiation in the foregoing embodiment, such judgment may be made by measuring the actual temperature of the motor housing 11.

(3) Although the foregoing embodiment is of the construction that each of the sector members 56 presses a corresponding one of the core components 14, the sector members and the core components may necessarily not be the same in number. Therefore, modifications may be made to take such a configuration that plural sector members press one core component or, conversely, one sector member presses plural core components.

Although the motor housing 11 is described as cylindrical, the external surface thereof may be square or polygonal.

Further, although the mechanism for actuating the straight-motion shaft 51 utilizes engagement of the cross bar 78 with the bar stops 79, that mechanism may be replaced by a solenoid operated device, a motor-operated device or the like.

Obviously, numerous modifications and variations of the present invention are possible in light of the above teachings. It is therefore to be understood that within the scope of the appended claims, the present invention may be practiced otherwise than as specifically described herein.

What is claimed is:

1. A method of manufacturing an electric motor by fitting a cylindrical stator core circumferentially dividable into a plurality of core components, into a circular internal surface of a motor housing, said method comprising the steps of:
    thermally expanding said motor housing;
    inserting said stator core inside said thermally expanded motor housing;
    thermally contracting said motor housing with said core components being kept pressed on said circular internal surface of said motor housing; and
    expanding said core components radially outward within said thermally expanded motor housing with a pressing mechanism to press said core components on said circular internal surface of said motor housing prior to the step of said thermally contracting said motor housing.

2. A method as set forth in claim 1, wherein the step of inserting said stator core includes temporarily holding said stator core with a ring being fit over the external surface of said stator core until at least a part of said stator core is fitted in said circular internal surfaced of said motor housing.

3. A method as set forth in claim 1, wherein said plurality of core components comprise a plurality of sector members which complete an annular body when assembled to make each of said sector members closely contact at lateral surfaces with other members next thereto, and wherein each of said core components is positioned so as to be sandwiched between two core components next thereto at circumferentially opposite ides when the external surface thereof is pressed by said motor housing which is thermally contracted to a smaller diameter as time goes.

4. A method as set forth in claim 3, wherein each of said plurality of core components is formed with a coil retaining slot at each of both lateral surfaces over the entire length thereof, and wherein an electric wire is wound around each of said core components to be retained within said coil retaining slots before said stator core is inserted inside said thermally expanded motor housing.

5. A method as said forth in claim 1, wherein the step of inserting said stator core inside said motor housing comprises moving said stator core upwardly into the motor housing from a position located below said motor housing.

6. A method of manufacturing an electric motor by fitting a cylindrical stator core circumferentially dividable into a plurality of core components, into a circular internal surface of a motor housing, said method comprising the steps of:
  thermally expanding said motor housing;
  inserting said stator core inside said thermally expanded motor housing;
  thermally contracting said motor housing with said core components being kept pressed on said circular internal surface of said motor housing; and
  mounting said motor housing on a table, wherein the step of inserting said stator core comprises the sub-steps of:
    temporarily holding said stator core with a ring being fit over the external surface of said stator core at an intermediate position in the axial direction thereof;
    inserting said stator core held with said ring into said circular internal surface of said motor housing by axially moving said stator core until said ring is brought into abutting engagement with said table, and
    completely inserting said stator core into said circular internal surface by further axially moving said stator core to thereby make said stator core become disengaged from said ring; and
  expanding said core components radially outward within said thermally expanded motor housing with a pressing mechanism to press said core components on said circular internal surface of said motor housing prior to the step of said thermally contracting said motor housing.

7. A method as claimed in claim 6, wherein the step of inserting said stator core inside said motor housing comprises moving said stator core upwardly into the motor housing from a position below said motor housing.

* * * * *